Sept. 28, 1926.

T. R. PALMER

SEALING AND POURING DEVICE FOR CONTAINERS

Filed Nov. 24, 1924

1,601,452

Inventor,
Thomas Reginald Palmer
by Connolly Bros.
Attys

Patented Sept. 28, 1926.

1,601,452

UNITED STATES PATENT OFFICE.

THOMAS REGINALD PALMER, OF LEICESTER, ENGLAND.

SEALING AND POURING DEVICE FOR CONTAINERS.

Application filed November 24, 1924, Serial No. 751,835, and in Great Britain December 19, 1923.

This invention has relation to closing and sealing means for liquid containers and the like, of that class in which a screwed stopper is fitted rotatively to a screw socket, the stopper and socket being provided with holes or passages to permit the outflow of the contents of the container, when the stopper is partly unscrewed in the socket, a suitable compressible washer being used to provide a liquid tight joint between the end of the stopper and the bottom of the socket, when the stopper is screwed home.

The object of the present invention is to provide means for enabling the contents of the container to issue at a point well beyond the side or end of the container and the invention accordingly consists in the construction and combination of features hereinafter more particularly described and claimed.

In the accompanying drawings—

Figure 1:
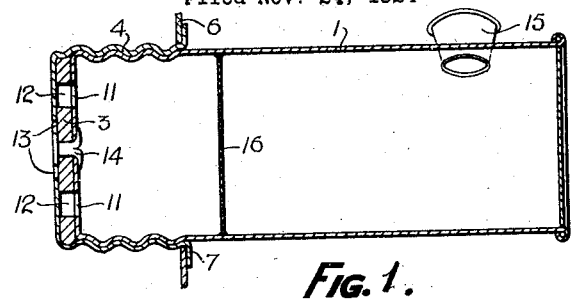
Fig. 1 is a central longitudinal sectional view of a stopper and socket embodying my invention, the stopper being shown as closed.
Figure 2:
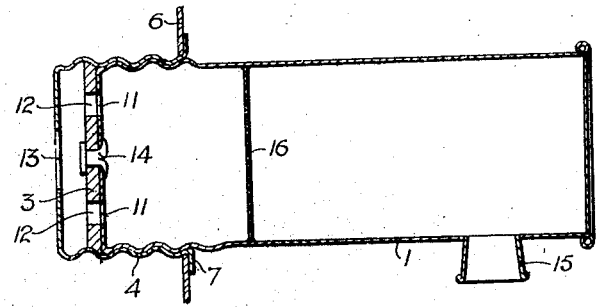
Fig. 2 is a similar view with the stopper in open position.

According to the embodiment of my invention illustrated in Figs. 1 and 2 of the drawings, there is provided a screwed stopper 1, having at its inner end a plurality of holes 11, and attached to said inner end a washer 3, having a corresponding plurality of holes 12, which register with the holes 11. The washer is conveniently attached to the stopper by means of a bifurcated rivet 14.

This stopper screws into a correspondingly screw threaded socket 4, in the bottom of which is a central hole 13. By screwing the stopper into the socket its full depth, the washer 3 is caused to cover the hole 13, in the bottom of the socket, as shown in Fig. 1, and thus prevent outflow of the contents of the container.

By unscrewing the stopper so as to remove the washer from the hole 13, as shown in Fig. 2, the oil or other contents of the container is allowed to pass through the hole 13, and pass out through the holes in the washer and stopper, the rate of outflow being regulated by the degree to which the stopper is unscrewed. The washer is made large enough to fit somewhat tightly within the socket so as to form a joint when the stopper is unscrewed, and prevent the oil from leaking out between the socket and stopper along the screw threads.

The socket 4 extends through a hole in the side of end 6 of the container and is preferably provided with a flange 7, so that it may be soldered or otherwise suitably secured to said side or end.

It will be understood that in the drawing off of the contents of the container, the stopper is not completely removed, but it is unscrewed in the socket to an extent sufficient to allow the contents to run out through the hole or passage in said stopper.

Figures 4, 5:
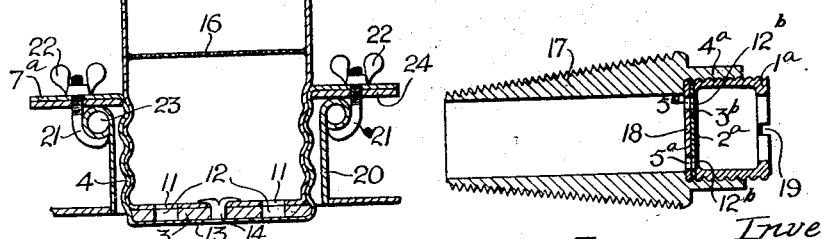

As illustrated particularly in Figs. 1, 2 and 5 the stopper embodying my invention is of a more elongated form than is usual in the type of stopper, and is formed with a closed outer end and with an outlet or nozzle 15, thereby enabling the oil or other liquid or fluid to issue at a point well beyond the side or end of the drum or container and in a manner similar to that resulting from the use of a tap. A stopper of this kind is particularly useful in transferring the contents of the drum or container to vessels or receptacles having somewhat restricted orifices. On comparing Figure 1 with Figure 2 it will be observed that the outlet or nozzle 15 is so situated that when the stopper is screwed tight into the socket 4, it extends more or less vertically upwards. By this means any oil or other liquid or fluid which remains in the stopper after the running-off operation, is prevented from dripping therefrom and consequently waste is avoided. The outlet or nozzle is, of course, brought into the running-off position by unscrewing the stopper to the desired extent. A cork or equivalent (not shown) attached by a chain or cord to the stopper 1 may be provided for insertion into the nozzle or outlet when not in use so as to prevent the entrance of dirt, dust or other foreign matter into the interior of the stopper, and to this end, the nozzle or outlet may be made tapered.

Figure 3:
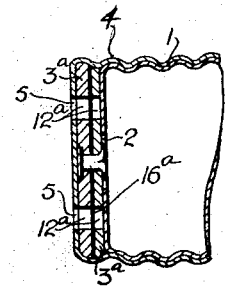
Figs. 3, 4 and 5 are sectional views of modifications.

If desired, a filter device may be combined with the stopper 1 or with the socket. For example, as shown in Figures 1, 2, and 5, a filter 16 formed by a disc of wire gauze or the like may be soldered or otherwise securely fixed in the body of the stopper. Alternately, as shown in Figure 3, the filter device may consist of a disc 16ª of wire gauze clamped between a pair of washers 3ª secured together by a bifurcated rivet or in any other suitable manner. This device is formed to fit tightly on the bottom of the socket 4. The washers 3ª may be provided with a series of holes 12ª registering with a corresponding series of holes 5 in the socket, in which case the stopper 1 will be furnished with a central hole 2. Or if desired, the washers 3ª may be formed with central holes for use with a stopper and socket having a series of holes and a central hole respectively.

Figure 4 shows the invention applied to a screwed plug 17 or equivalent for use in barrels, kegs and the like, said plug being formed with a screwed socket 4ª in which is fixed a plate 18 provided with a plurality of holes 5ª. A leather or other washer 3ᵇ having holes 12ᵇ therein corresponding to the holes 5ª is inserted in the socket over the plate 18 and the screwed stopper 1ª provided with a central hole 2ª is screwed into the socket. The stopper may be provided with notches 19 to enable it to be rotated by means of a bar or key. Or a central hole may be formed in the plate 18 and washer 3ᵇ and a series of holes in the stopper. If desired the washer 3ᵇ may be fixed to the stopper by means of a rivet in the manner previously described. The elongated form of stopper shown in Figures 1 and 2 may of course be used in the arrangement just described.

The devices herein described may be used for closing and sealing drums or containers prior to sale and during transit. In each case the stopper would be screwed tightly into the socket and secured by a wire passed through holes, notches or slots in the stopper and through one or more lugs or eyes (not shown) on the drum, or container.

Instead of using the drawing-off stopper as a closure and sealing member, a screw stopper without any hole or passage therethrough may be employed for this purpose in conjunction with either a plain disc of leather or other suitable material or a washer in the socket, this stopper being screwed in tightly and sealed as aforesaid. In this event a drawing-off stopper with or without a washer as the case may be, would be supplied separately with the drum or the like and would be used after the drum had been opened by removal of the sealed stopper and disc if the latter be provided temporarily in lieu of a washer. This method admits of a short compact stopper being used during transit and storage and a longer stopper being used for drawing-off, the advantage of the longer stopper being that the contents when being delivered are prevented from running down the outside of the drum or its support.

The short stopper is less likely to suffer damage during transit than would be the longer one which has a greater projection from the drum.

The socket is preferably inserted and fixed in the drum or container so as not to project on the outside of same. I may use a socket and sealing disc construction the same as or similar to that described in the aforesaid specification and insert the sealing disc without holes so that it acts as a seal to guard the contents in the known manner. In order to use a drawing-off stopper in this case, it would only be necessary to make one or more holes in the sealing disc by piercing same with a nail or suitable instrument and then insert the drawing-off stopper and its associated washer into the socket. Care would have to be taken in piercing the seal that the hole or holes formed in said disc did not register with the holes or hole in the washer and stopper. When the stopper was screwed into the socket the washer would be pressed against the pierced sealing disc to shut off flow of the contents.

According to a further form of the invention, the closing, sealing and drawing-off means may be supplied as an independent unit in which any one of the constructions previously described with reference to Figures 1 to 3, may be employed for use with a drum or container having an outlet nozzle of the type shown in Figure 5, i. e. of the kind normally closed by a cork or plug, and means may be provided for attaching said unit to the outlet.

Conveniently and as shown in Figure 5, an arrangement of this nature comprises a stopper 1 of the form previously described with reference to Figures 1 and 2 screwed into the socket 4 which in this case is provided with a wider flange 7ª for the reception of the means for attaching the unit to the beaded outlet 20. Said fastening means may comprise a plurality of screw-threaded hooked members 21, e. g. four, fitted with wing nuts 22 or equivalent devices, said members being passed through holes in the flange so as to engage the bead 23 when the socket has been placed in the outlet; and when the nut devices are tightened up to form a joint between the socket and the nozzle. A leather washer 24 or other suitable packing piece is provided between the flange 7ª and the bead 23 to prevent leakage of the contents of the drum or container.

A socket 4 formed with a flange 7ª having holes therein is also adapted for use in a wooden barrel or keg since, it may be inserted in the usual bung hole and secured in position together with a packing piece by nails or screws driven through the holes in the flange into the wood. This socket together with the necessary stopper and washer or a filter device may be used for closing and sealing the barrel or keg prior to sale and during transit or the unit may be supplied independently.

What I claim then is:—

1. Closing, sealing and drawing-off means for containers for liquids and other substances comprising, in combination, an elongated screwed stopper having a permanently closed outer end and a hole in its inner end, an outlet nozzle on said stopper, a screwed socket which receives the stopper and has a hole therein which is out of register with the hole in the stopper, and a compressible washer having a hole in it which registers with one of the aforesaid holes, said washer forming a joint between the stopper and the socket when the stopper is screwed down for the purpose specified.

2. Closing, sealing and drawing-off means for containers for liquids and other substances, comprising, in combination, an elongated screwed stopper having a closed outer end and a hole in its inner end, a screwed socket which receives said stopper and has a hole therein which is out of register with the hole in the stopper, a tapered nozzle on the stopper at or near the closed end thereof, said nozzle extending substantially upwards when the stopper is screwed down, and downwards when the stopper is partly unscrewed in the socket, and a compressible washer having a hole therein which registers with one of the aforesaid holes, said washer forming a joint between the socket and the stopper when the latter is screwed down, for the purpose specified.

In testimony whereof I affix my signature.

THOMAS REGINALD PALMER.